Feb. 19, 1963 M. HIRSCH 3,077,816
THREE DIMENSIONAL OPTICAL DISPLAY APPARATUS
Filed Feb. 5, 1959
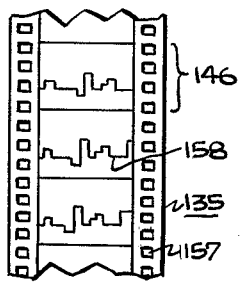
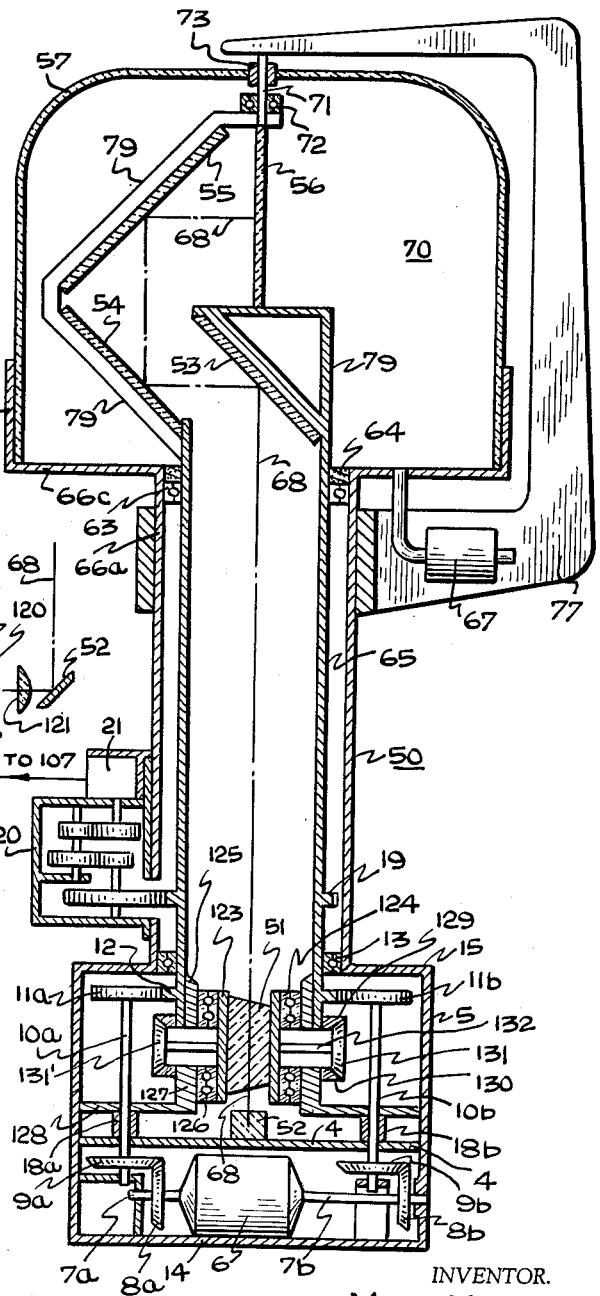
INVENTOR.
MAX HIRSCH
BY Sheldon Kapustin
ATTORNEY

3,077,816
THREE DIMENSIONAL OPTICAL DISPLAY APPARATUS
Max Hirsch, 4810 N. 11th St., Philadelphia, Pa.
Filed Feb. 5, 1959, Ser. No. 791,328
8 Claims. (Cl. 88—24)

This invention relates to an improved means for presenting images that are reproductions in three dimensions of scenes, solid objects, and arrays of points in space. More particularly, this invention relates to an improvement in the apparatus disclosed in my copending patents filed January 13, 1958, Patent Number 2,967,905, titled "Three Dimensional Display Apparatus," and filed November 12, 1958, Patent Number 2,979,561 titled, "Improved Three Dimensional Display Apparatus"; and is a continuation in part of the first mentioned patent.

The representation of scenes by models, solid objects by sculpture, of surfaces by semi-relief sculpture, and of arrays of points in space by mechanical models has long been known. The art of forming two dimensional images by photographic and electronic techniques has been well developed and this art has been extended to give perception in a third dimension by means of stereoscopy. Attempts have been made to generate true three dimensional images, for example, as taught in the Ferrill patent, Number 2,361,390 and the Marx patent, Number 2,543,793, whereby sections of solid images are displayed on a screen. These patents disclose apparatus for displaying an image on a screen which was cyclically moved with effective linear displacement.

This invention employs the principle of forming and displaying a sequence of two dimensional images of sections of a volume on a screen which is rotated to sweep out a volume at such a rate that perisistence of vision give the perception of sustained solid or three dimensional images, that may have color and motion. This basic principle of sweeping out three dimensional images by rotating a viewing screen has already been taught in my prior copending patents (supra). The advantages of such an arrangement are that the screen may be of such form that convenient sections, e.g. diametrical or radial sections, of the solid can be displayed, large volumes can be swept out, and the forces caused by the cyclic motion of the screen can be made constant. This three dimensional optical display apparatus for displaying three dimensional views of solids or volumes may also be called a "generescope," since the displacement of a series of two dimensional images generates solid or three dimensional images here as in my prior patents.

An apparatus previously disclosed in the first patent referred to above, employed a rotatable two dimensional image producing means which took the form of a cathode ray tube. Images formed on the rotatable cathode ray tube were transmitted by a rotatable projection apparatus onto a screen rotating in unison with the projection apparatus as well as the cathode ray tube. The apparatus disclosed herein, however, obviates the use of such an image forming device as a cathode ray tube and employs an optical high speed moving film projector to cast images of sections of scenes on a rotating screen which sweeps out a volume, thus displaying a three dimensional image. In particular there is disclosed in this embodiment, a projection apparatus which projects from a strip of film, in rapid order, cross-sectional images of a volume to be displayed. These images are passed through a dove prism which rotates the images produced by the projector and casts them onto a rotating screen so that their orientation on the screen remains fixed. The rotating screen sweeps out a display volume, and consequently displays a three dimensional image much in the same manner as described in my aforementioned patents.

Many of the features described in connection with my aforementioned patents can be again used with the device described herein, for example, image reversion there described may be used so that three dimensional images may be viewed in this apparatus over a very large solid angle. While retaining many of the aspects of the apparatus disclosed in the parent cases, the display device herein described has certain advantages not found in the former apparatus. For example, the present display device is essentially an optical-mechanical device and does not require the use of complex, less reliable, electronic equipment. It follows that this display apparatus may be more simply constructed. Another advantage of this device rests in the use of a moving film type projector instead of a cathode ray tube. The moving film projector generates an entire sectional image at once, and does not require the use of scanning techniques. As a result, data, that is, whole sectional images of scenes are displayed for the entire period of an angular increment of screen movement so that the amount of detail in a given section is limited only by the film resolution. Further, the brightness is increased, and when color film is used, three dimensional images in color are produced.

The objects of this invention are many and those mentioned below can be considered a typical category.

One object of this invention is to provide an improved means for presenting three dimensional images.

Another object is to provide an improved means for displaying three dimensional images comprising a rotating screen, and a high speed optical projector including an optical-mechanical device for rotating images to be projected on said screen in synchronism therewith.

Another object of this invention is to provide an improved means for displaying three dimensional images which can be simply constructed with essentially mechanical-optical apparatus.

Another object of this invention is to provide an improved means for displaying three dimensional images on a rotating screen, including a prism for rotating images in synchronism with the screen.

Another object of this invention is to provide an improved three dimensional display apparatus comprising a moving film projector for displaying all the elements of a section of a scene at the same time.

Another object is to provide a means for displaying three dimensional images that employs primarily mechanical and optical means with a minimum of electronic elements.

Another object of this invention is to provide means for displaying three dimensional images showing great detail.

A further object of this invention is to provide a means of displaying three dimensional images of considerable brightness.

Another object of this invention is to provide means for displaying three dimensional images in color.

Another object of this invention is to provide an efficient means of displaying three dimensional images in accordance with data recorded on photographic film.

Another object of this invention is to provide a means for displaying three dimensional images including a stationary image generator.

The specific description of the embodiment of this invention illustrates the principles on which it is founded, and indicates other embodiments and other modes of operation, as well as, other objects and uses. It is to be expressly understood that the embodiment of the invention disclosed herein is meant to be illustrative only of the mechanisms employing the principles of this invention, and serves as a teaching of any equivalent structure that could be used.

Referring now to the figures that form part of this disclosure, there is shown in:

FIGURE 1, a cross sectional view of the display portion of an optical rotary three dimensional display assembly.

FIGURE 2, a cross sectional diagrammatic view of a high speed optical projector portion of an optical rotary three dimensional display assembly.

FIGURE 3, broad view of film showing a pictorial sequence of sections of a scene.

Referring now to FIGURE 1, there is shown a display apparatus 50 for presenting three dimensional images to an observer comprising mirror 52, dove prism 51, mirrors 53, 54, 55, and a rear projection screen 56, arranged and mounted such that elements 53 through 56 rotate together and that an image projected upward from mirror 52 is further projected onto the rear projection screen 56 through dove prism 51. A central ray of light 68 from a central point on the mirror 52 illustrates this projection.

Images projected upward from mirror 52 are rotated in unison with the rotation of optical elements 53 to 56 by means of dove prism 51 in a manner to be described later. Cylinder 65 and structure 79 which support the optical elements 53 to 56 are rotated by a mechanism also to be described later.

Structure 79 in its upper section consists of a periscope-like arrangement on which mirrors 54 and 55 are mounted. The lower section of structure 79 supports mirror 53 and contains an aperture for the transmission of light from mirror 53 to 54. The rear projection screen 56 is mounted between the two aforementioned sections of structure 79. Cylinder 65 and structure 79 are supported by bearing 63, bearing 13, and constrained by bearing 72. The assembly of support structure 79, hollow tube 65, and the optical elements 53 to 56 rigidly attached therein are driven by motor 6 via a gearing arrangement to be later described so that the aforementioned elements all rotate in unison, while dove prism 51 is rotated one-half the angular speed of that of hollow tube 65 and the optical elements 53 to 56.

The basic supporting structure for the display apparatus 50 is the rigid housing that consists of a long hollow cylinder 66a and shorter, but broader cylinder 66b, connected by an annular plate 66c. A rigid arm 77 attached to housing 66a has a fixed shaft 71 that fits into a bearing 72. Bearing 72 keeps the rotating assembly of structures 79 and 65 aligned with supporting arm 77 and cylinder 66a. While the rotating system is not symmetrical, it can be balanced by well-known methods.

The display chamber 70 containing the rear projection screen 56 is partially enclosed by a transparent cover 57 through which the display on the screen 56 can be observed. The broad cylinder 66b and the annular ring 66c enclose most of the remaining portion of the display chamber 70.

Chamber 70 can be air tight. A pneumatic exhaust pump 67 mounted on arm 77 and coupled to chamber 70, keeps chamber 70 at reduced air pressure relieving the screen 56 and the structure 79 of air loading thereby lowering the drag on motor 79.

The apparatus for rotating cylinder 65, structure 79, and optical elements 53 to 56 comprises an electrical motor 6 which through shafts 7a and 7b at each end thereof drives bevel gears 8a and 8b respectively. Bevel gears 8a and 8b rotate bevel gears 9a and 9b respectively which in turn drive their shafts 10a and 10b. Gears 11a and 11b rigidly attached to their respective shafts 10a and 10b transmit the motion they receive to ring gear 12, which is rigidly attached to cylinder 65. The double or balanced drive system comprising elements 6 to 12 inclusive applies a pure couple to drive cylinder 65. This obviates the application of a balancing force by bearing 13 which supports and constrains cylinder 65. The drive system is basically supported by the lowest housing member cylinder 5, the base plate 14 to which it is attached at its lower end, and the lower annular plate 15 to which it is attached at its upper end. This plate 15 is attached at its inner perimeter to hollow housing cylinder 66a.

An accurate ring gear 19 is rigidly mounted on rotating cylinder 65. Gear 19 drives a gear train 20 that transmits the rotation of cylinder 65 to servo generator 21 and is so proportioned that the angular displacements of the cylinder 65 and the armature (not shown) of the servo motor 21 are equal. Servo generator 21 controls servo amplifier 107 which in turn drives servo motor 106 (see FIGURE 2). Servo-motor 106 is linked to and thus drives all of the rotating elements of the motion picture projection apparatus shown in FIGURE 2.

Rotating cylinder 65 also supports and drives rotating dove prism 51 in a manner and with apparatus to be later described.

A high speed optical projection apparatus 100 is shown diagrammatically in FIGURE 2. It comprises a photographic motion picture projector operating at high speeds. Film 135 (shown in detail in FIGURE 3) supplies the data for images to be projected and comprises a series of frames 146 each of which consists of a sectional view of a three dimensional scene. The projector 100 focuses an enlarged image of each frame 146 on the rear projection screen 56 via the optical path comprising a stationary mirror 52, dove prism 51, and mirrors 53 to 55. The dove prism 51 rotates the projected sectional images so that their orientation on rear projection screen 56 is fixed while the screen 56 rotates to sweep out a volume of a three dimensional image.

Refer now to FIGURE 2 in conjunction with FIGURE 1. It should be understood that the two cross sectional views in FIGURES 1 and 2 are mutually perpendicular. The high speed optical projection apparatus 100 comprises a film supply reel 103, a pair of sprocket wheels 105 and 105', and a film take-up reel 104. Each of the sprocket wheels 105 and 105' has teeth 133 which engage the sprocket holes 157 on a film 135 (FIGURE 3). Optical projection apparatus 100 also includes a flash lamp 110 which produces short bursts of light 109 that are condensed by lenses 111 to a focus on a film 135. Light stops 112 adjacent to film 135 limit the light 109 to illuminate only film 135. The light passes through film 135 and then through rotating prism 117 and thence passes through objective lenses 120 and 121 to mirror 52. Associated with sprocket wheel 105' is a variable reluctance pick up 113 which produces a pulse each time one of the teeth 133 on wheel 105' passes head 113. Output signals from head 113 are transmitted to a triggering circuit 114 and a modulator-driver 115 which in turn drives flash light source 110.

Servo motor 106, which is controlled by drive motor 6 (FIGURE 1) drives the sprocket wheels 105 and 105' as well as a rotating prism 112 through gears 118.

In operation, film 135 is transported from storage reel 103 to takeup reel 104 by the action of sprocket wheels 105 and 105'. The motion of film 135 is constant and synchronous with the rotation of screen 56 since sprocket wheels 105 and 105' are driven by servo motor 106 which is controlled by servo generator 21 through servo amplifier 107. A burst of light 109 from flash light source 110 is condensed by lenses 111 to focus on a frame 146 of film 135 that is moving with constant speed. Light stop 112 limits the illumination of film 135. Two means are employed to effectively stop the film 135 and make the projected images of a sequence of frames such as frame 146 on screen 56 clear and distinct, that is, not a blur.

The first means comprises a variable reluctance pick-up 113 mounted close to sprocket wheel 105' so that it generates an electrical pulse every time a tooth 133 passes by. The pulses from variable reluctance pick-up 113 are conducted to trigger circuit 114 and modulator-driver 115 where they are amplified and shaped into sharp driving pulses. These trigger pulses are fed into flash lamp projector 110 where they release a short duration pulse of electric energy to the aforementioned light source 110. The flash light source converts the burst or pulses of electric energy it receives from trigger circuit 114 into bursts of pulses of light energy whose duration is approximately that of the exciting pulse. (See High Repetition Rate Stroboscopic Light Source by C. C. Rockwood and W. P. Harvey, Journal of Motion Picture and Television Engineering, August 1954, page 64.) Some of the light from flash light source 110 strikes a spherical reflector 116 and is reflected back to its source which it reinforces. The pulse of light 109 from source 110, however as previously stated, is condensed by lenses 111 and is focused on frame 146. Thus a pulse of light 109 illuminates a frame 146 for a short period (determined by circuits 114 and 115) and synchronized by variable reluctance pickup 113 to occur when a frame, such as frame 146, is at a central position on the optical axis 119 of projector 100.

Light passing through frame 146 strikes rotating prism 117 which comprises the second means for effectively stopping the film 135. Rotating prism 117 is driven by servo motor 106 through a train of gears 118 so that its rotary motion is synchronous with the linear motion of film 135 and a flat face of prism 117 is parallel to each frame 146 when the frame is in a central position on optical axis 119. The optical action of prism 117 is to bend the rays of light it receives from an illuminated frame 146 back to a central path. Thus, prism 117 lowers the light rays it receives from a frame, such as frame 146, when the frame is above its central position and raises the light rays when the frame is below its central position. If the illumination of a frame 146 were sustained for an entire display period (i.e. the time the frame could receive light from source 110), the action of rotating prism 117 would effectively stop the movement of frame 146 and the image projected on the screen 56 would not be blurred. Therefore, the synchronized rotating prism 117 constitutes a second means for effectively stopping the movement of film 135. Either of these methods can be used alone, that is, short light pulses and no rotating prism 117, or a constant light source and a rotating prism 117. However, the two methods can be used together as shown in FIGURES 1 and 2 to give improved definition over either method used alone.

Light having passed from frame 146 to prism 117 is refracted by objective lenses 120 and 121. This pair of objective lenses 120 and 121 focus an enlarged image of frame 146 on screen 56. The light leaving objective lens 121 strikes mirror 52 (FIGURE 1) that is inclined at an angle so as to direct the reflected light up the center of cylinder 65. This inclined mirror 52 is fixed in position and rests on support plate 4. Mirror 52 provides a mutual optical member that links the high speed projection system 100 with the display means of "generoscope" 50.

Light leaving mirror 52 passes through rotating dove prism 51 whose action is to effectively rotate a virtual source of light (or virtual object) horizontally in unison with the rotation of screen 56. (This effect could also be achieved by removing the motor 6, mirror 52, dove prism 51, and rigidly mounting the high speed projection system 100 to rotating cylinder 65 with the objective lens 121 directed upward.) Dove prism 51 is rigidly mounted in tube of 123, which is supported by bearing 124. The outer element of bearing 124 is in turn supported by a collar 125 which is rigidly attached to rotating cylinder 65. Tube 123 is also supported by a bearing 126 whose outer element is supported by collar 127. Collar 127 is integral with the support plate 128 and accordingly is fixed in position. Bevel gear 129 is rigidly mounted on and rotates with cylinder 65, whereas a companion bevel gear 130 is rigidly mounted on the outside of collar 127 and is fixed in a position. Differential gears 131 and 131' are mounted to rotate on corresponding shafts 132 and 132' that are fixed to tube 123 which holds prism 51. The assembly of differential gears 131 and 131', shafts 132 and 132', tube 123, and dove prism 51 rotates between upper bevel gear 129 and fixed lower bevel gear 130 at half the angular speed of rotating cylinder 65. However, the optical speed of rotation of a dove prism is twice its physical angular speed (see Fundamentals of Optical Engineering by Donald H. Jacobs, page 158, published by McGraw-Hill Publishing Company, 1943); therefore, the angular speed of optical rotation of dove prism 51 is equal to the angular speed of cylinder 65. Thus, a virtual source of light (an illuminated frame 146 projected upward as an apparent source) is rotated in unison with screen 56 which is rigidly attached to cylinder 65.

The light leaving dove prism 51 is reflected by mirrors 53, 54, and 55, and finally comes to a focus on rear projection screen 56. A central ray of light 68 from a central point on the image source (frame 146) illustrates the path of light from the object (frame 146) to image (on screen 56). Ray 68 passes through rotating prism 117, lenses 120 and 121, and is reflected by mirror 52. Then it passes through dove prism 51 and is reflected by mirrors 53, 54, and 55 to a central position on rear projection screen 56.

Every element of a scene recorded on a frame such as frame 146 is simultaneously illuminated by the burst of light from flash lamp 110 for the entire period of the light burst. This has two advantages over a cathode ray tube image source in which each element of the image is energized in sequence. The brightness of the image is increased because each element is energized for a longer period of time and the number of elements in the image are no longer limited by scanning time, but virtually by the amount of detail desired in the three dimensional image. In this invention, as in my previously mentioned inventions, the screen rotates at a rate sufficient to exhibit apparently persisting images. The rate is over 20 cycles per second. Each two dimensional image is exhibited for $180/N$ degrees and each degree is swept out in less than $1/7200$ of a second. For $N=180$, that is, a frame per degree, the frame speed is greater than 7200 frames per second. Such frame speeds are encountered in high speed photography. This entire period, less than $1/7200$ second, is employed to illuminate and project each and every element of a single frame simultaneously. With a cathode ray tube image source that same small period, less than $1/7200$ of a second, must be distributed among the many elements in the image.

A sequence of frames such as 146 gives rise to a sequence of images in display chamber 70 (i.e. in the volume that screen 56 sweeps out). A sequence of N frames such as frames 146 constitutes a division that produces a single three dimensional image in a half rotation of screen 56. This assumes that film strip 135 has a frame such as 146 for each $180/N$ degrees displacement of screen 56. It will be appreciated that a division may include any number (N) of frames, such as frame 146, and this number N will determine the resolution of the image displayed in the chamber 70. After the first division is presented by projector 100, another division of N frames is shown. The second division is a substantial repetition of the previous division if the three dimensional image swept out in the next half rotation of screen 56 is to correspond to the previous three dimensional image. However, the data on each frame of the second division is reverted horizontally when compared to the corresponding frame of the previous division. As previously explained in the prior patents referred to above, reversion of the image in the second half of the rotation of screen 56 is necessary due to the optics of the system. The two divisions constitute a bloc. A sequence of such paired divisions or blocs produces a sequence of three dimensional scenes in which motion may be displayed. As previously stated, by using colored film, the three dimensional scenes can be made to show color along with motion.

While FIGURE 2 shows the high speed projector 100 using a strip of film 135, this arrangement requires slight changes to effect operation with a loop of film 135. A small loop of film comprising a single bloc of frames 146 can be used to display a stationary three dimensional scene. A large loop of film comprising M blocs may be used to exhibit cyclic motion involving M separate three dimensional scenes. The term "three dimensional scene" used here and in previous embodiments to mean any three dimensional pictorial light displays that include line and surface patterns.

Having thus described my invention, I claim:

1. An apparatus for the exhibition of three dimensional images in a volume comprising a movable viewing screen for sweeping out said volume through cyclic motion, an image producing means comprising means for projecting a sequence of two dimensional images from said image producing means onto said viewing screen at any position thereof, a film strip containing data for a plurality of two dimensional images, said means for projecting including a high speed motion picture projector for projecting data of said film strip and including a high speed pulsating light source for forming clear two dimensional images that show apparently no traverse motion on said screen.

2. The apparatus defined in claim 1 further including sprocket means for moving said film strip, and sensing means associated with said sprocket means and coupled to said light source for triggering said light source each time said sprocket means moves a predetermined length of film.

3. An apparatus for the exhibition of three dimensional images in a volume comprising a rotatable viewing screen for sweeping out said volume, and an image producing means comprising projection means for projecting a sequence of two dimensional images on said viewing screen at any position thereof at a rate to form apparently persisting images in said volume and for producing an array of elements of each of said two dimensional images concurrently.

4. The apparatus according to claim 3, further including a film strip containing data for a plurality of two dimensioned images and said projection means includes a high speed motion picture projector for projecting data of said film strip.

5. The apparatus defined in claim 3 wherein said image producing means is fixed in position and further including an image rotation means interposed between said image producing means and said rotatable screen for rotating images projected from said image producing means in synchronism with the rotation of said screen whereby said images retain their orientation on said screen.

6. An apparatus according to claim 5 wherein said image rotation means is a dove prism.

7. The apparatus defined in claim 5 further including means coupled to said screen and said image rotation means for rotating said image rotation means at half the speed of said screen.

8. An apparatus for the exhibition of three dimensional images in a volume comprising a rotatable viewing screen adapted to sweep out said volume, and an image producing means comprising projection means for projecting a sequence of two-dimensional cross-sectional images on said viewing screen at any position thereof at a rate to form apparently persisting three dimensional images in said volume and for producing an array of elements in each of said two-dimensional images concurrently.

References Cited in the file of this patent

UNITED STATES PATENTS

| | | |
|---|---|---|
| 1,928,255 | Holst | Sept. 26, 1933 |
| 2,361,390 | Ferrill | Oct. 31, 1944 |
| 2,454,959 | Barnes | Nov. 30, 1948 |
| 2,587,433 | Bentley et al. | Feb. 26, 1952 |
| 2,671,377 | Downes et al. | Mar. 9, 1954 |

FOREIGN PATENTS

| | | |
|---|---|---|
| 750,911 | Great Britain | June 20, 1956 |